US012267649B2

(12) United States Patent
Wang et al.

(10) Patent No.: US 12,267,649 B2
(45) Date of Patent: Apr. 1, 2025

(54) MICROPHONE CHIP

(71) Applicant: AAC ACOUSTIC TECHNOLOGIES (SHENZHEN) CO., LTD., Shenzhen (CN)

(72) Inventors: Kaijie Wang, Shenzhen (CN); Zhuanzhuan Zhao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 191 days.

(21) Appl. No.: 18/072,661

(22) Filed: Nov. 30, 2022

(65) Prior Publication Data

US 2024/0073625 A1 Feb. 29, 2024

Related U.S. Application Data

(63) Continuation of application No. PCT/CN2022/119299, filed on Sep. 16, 2022.

(30) Foreign Application Priority Data

Aug. 25, 2022 (CN) ........................ 202222257737.4

(51) Int. Cl.

| | |
|---|---|
| ***H04R 19/04*** | (2006.01) |
| ***H04R 1/04*** | (2006.01) |
| ***H04R 1/06*** | (2006.01) |
| ***H04R 7/06*** | (2006.01) |
| ***H04R 7/18*** | (2006.01) |

(52) U.S. Cl.

CPC ............... *H04R 19/04* (2013.01); *H04R 1/04* (2013.01); *H04R 1/06* (2013.01); *H04R 7/06* (2013.01); *H04R 7/18* (2013.01); *H04R 2201/003* (2013.01)

(58) Field of Classification Search

CPC .... H04R 19/04; H04R 2201/003; H04R 1/04; H04R 31/00; H04R 9/08; H04R 17/02; H04R 19/016; H04R 1/06; H04R 7/06; H04R 7/18

USPC ................. 381/174, 191, 355, 361, 113, 122

See application file for complete search history.

(56) References Cited

FOREIGN PATENT DOCUMENTS

| | | |
|---|---|---|
| CN | 107484051 | * 12/2017 |
| CN | 114885264 | * 8/2022 |

* cited by examiner

*Primary Examiner* — Norman Yu

(74) *Attorney, Agent, or Firm* — W&G Law Group

(57) ABSTRACT

A microphone chip is provided and includes a substrate and a capacitive system. The capacitive system includes a diaphragm and a back plate. The diaphragm includes an inner membrane portion, an outer membrane portion, and at least one supporting portion. The inner membrane portion and the outer membrane portion of the microphone chip are separated by a slit, and the at least one supporting portion is connected with the fixing portion to fix the diaphragm, so that the diaphragm is in a cantilever state. By arranging the sealing element between the back plate and the diaphragm, the inner membrane portion is attracted and adsorbed on the sealing element by electrostatic force, and the sealing element is configured to support the inner membrane portion to reach an operating state, thereby reducing the low attenuation of the microphone.

11 Claims, 4 Drawing Sheets

MICROPHONE CHIP

CROSS REFERENCE TO RELATED APPLICATIONS

The present application is a continuation of PCT Patent Application No. PCT/CN2022/119299, filed Sep. 16, 2022, which claims priority to Chinese patent application No. 202222257737.4, filed Aug. 25, 2022, each of which is incorporated by reference herein in its entirety.

TECHNICAL FIELD

The embodiments of the disclosure relate to the technical field of capacitive microphones, in particular to a microphone chip.

BACKGROUND

With the development of wireless communication, mobile phone users are increasingly increased in the world. Users' requirements for mobile phones are not only satisfied with calls, but also able to provide high-quality call effects. Especially with the development of mobile multimedia technologies, the call quality of the mobile phone is more important. As a voice pickup device of the mobile phone, a design of a microphone of the mobile phone directly affects the call quality.

At present, microphones commonly used are capacitive microphones and micro-electro-mechanical system (MEMS) microphones, which are widely used in various terminal devices. The capacitive microphone includes a diaphragm and a back plate, which constitute a MEMS acoustic sensing capacitor, and the MEMS acoustic sensing capacitor is connected to a processing chip through a connecting disk to output an acoustic sensing signal to the processing chip for signal processing. In the prior art, deflation phenomenon occurs from a front cavity to a back cavity of the microphone, which easily leads to low attenuation of the microphone.

SUMMARY

Embodiments of the disclosure provide a microphone chip, so as to reduce a risk of low attenuation of the microphone.

Embodiments of the disclosure provide a microphone chip. The microphone chip includes a substrate having a front cavity and a capacitive system disposed on the substrate and connected to the substrate. The capacitive system includes a diaphragm disposed on an upper surface of the substrate and a back plate spaced from the diaphragm, and there is an air spacing defined between the diaphragm and the back plate. The microphone chip further includes a fixing portion, and the diaphragm and the back plate are respectively connected with the substrate through the fixing portion. The diaphragm includes an inner membrane portion, an outer membrane portion, and at least one supporting portion. The inner membrane portion is separated from the outer membrane portion by a slit, and the at least one supporting portion is connected with the fixing portion. The microphone chip further includes a sealing element, the sealing element is connected with the back plate and disposed between the back plate and the diaphragm, and the sealing element is disposed close to an outer periphery of the inner membrane portion.

In some embodiments, the back plate defines at least one air outlet hole, and the at least one air outlet hole is defined in a region of the back plate surrounded by the sealing element.

In some embodiments, the back plate defines at least one vent hole, and the at least one vent hole is defined outside the region of the back plate surrounded by the sealing element.

In some embodiments, each of the at least one supporting portion extends outward from an edge of the inner membrane portion and is connected to the fixing portion.

In some embodiments, the at least one supporting portion is configured as one or more supporting portions.

In some embodiments, the microphone chip further includes an electrode sheet, the electrode sheet includes an electrode body and at least one lead-out portion, and the at least one lead-out portion is configured as one or more lead-out portions.

In some embodiments, the electrode sheet is disposed on a side of the back plate close to the diaphragm, and the electrode body is disposed inside the sealing element. The sealing element defines at least one notch, and each of the at least one lead-out portion extends outward along a corresponding notch of the at least one notch.

In some embodiments, a height of each of the at least one notch is equal to a height of the sealing element in a thickness direction of the microphone chip.

In some embodiments, in a thickness direction of the microphone chip, a height of each of the at least one notch is less than a height of the sealing element, and the at least one notch is defined close to the back plate.

In some embodiments, the electrode sheet is disposed on a side of the back plate away from the diaphragm. The at least one lead-out portion extends outward along the electrode body.

In some embodiments, the at least one supporting portion is configured as a plurality of supporting portions.

The disclosure has following advantageous effects. The diaphragm is processed to have the inner membrane portion, the outer membrane portion, and the at least one supporting portion. The inner membrane portion and the outer membrane portion are separated from each other by a slit. The at least one supporting portion is connected with the fixing portion to fix the diaphragm, so that the diaphragm is in a cantilever state, the stress of the diaphragm material is fully released, and smooth movement of the diaphragm is improved. By arranging the sealing element between the back plate and the diaphragm, when the microphone is in an operating state, the inner membrane portion is attracted and adsorbed on the sealing element by electrostatic force, and the sealing element is configured to support the inner membrane portion to reach the operating state, thereby reducing the low attenuation of the microphone.

Figure 1:
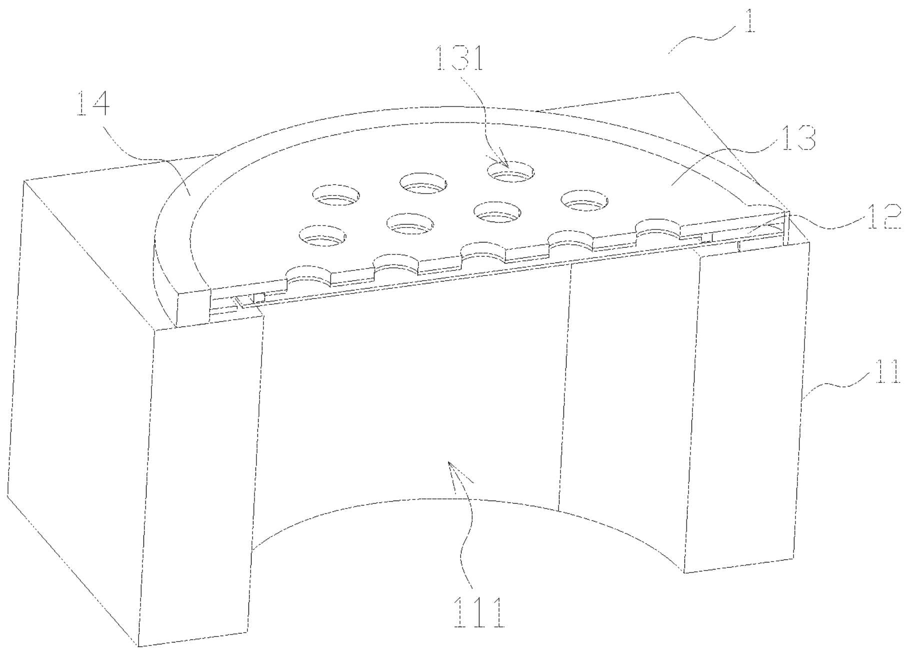
FIG. 1 is a cross-sectional view of a microphone chip according to embodiments of the disclosure.

The reference numerals are shown as follows: 1: microphone chip; 11: substrate; 111: front cavity; 12: diaphragm; 121: inner membrane portion; 122: outer membrane portion; 123: supporting portion; 13: back plate; 131: air outlet hole; 14: fixing portion; 15: sealing element; 151: notch; 16: electrode sheet; 161: electrode body; 162: lead-out portion.

DETAILED DESCRIPTION OF THE EMBODIMENTS

The disclosure is further explained below with reference to the accompanying drawings and embodiments.

The embodiments provide a microphone chip 1 aimed at reducing the risk of low attenuation of a microphone.

Figure 5:
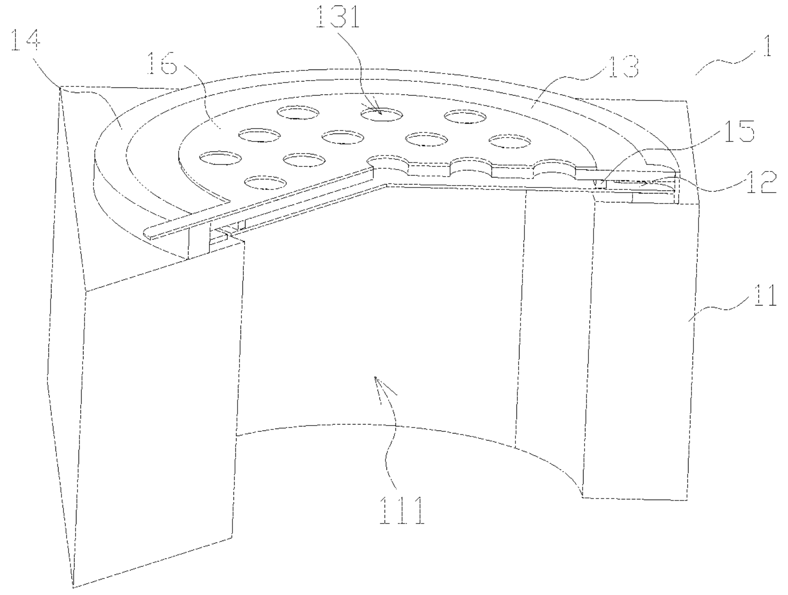
FIG. 5 is a cross-sectional view of a microphone chip according to other embodiments of the disclosure.

Specifically, as shown in FIGS. 1 and 5, the microphone chip 1 includes a substrate 11 having a front cavity 111 and a capacitive system. The capacitive system is provided on the substrate 11 and connected to the substrate 11. The capacitive system includes a diaphragm 12 disposed on an upper surface of the substrate 11 and a back plate 13 spaced from the diaphragm 12, and there is an air spacing defined between the diaphragm 12 and the back plate 13. When an external sound is transmitted to the diaphragm 12 through the front cavity 111, the diaphragm 12 senses the external sound pressure and generates vibration, so that a distance between the diaphragm 12 and the back plate 13 changes and thus, a capacitance value between the diaphragm 12 and the back plate 13 changes (i.e., the capacitance value of the capacitive system is changed), thereby realizing the conversion from the sound signal to an electrical signal.

The microphone chip 1 includes a fixing portion 14. The diaphragm 12 and the back plate 13 are connected to the substrate 11 through the fixing portion 14. The diaphragm 12 includes an inner membrane portion 121, an outer membrane portion 122, and at least one supporting portion 123. The inner membrane portion 121 and the outer membrane portion 122 are spaced from each other by a slit, and the at least one supporting portion 123 is connected to the fixing portion 14. Specifically, the diaphragm 12 is processed so that the diaphragm 12 includes the inner diaphragm portion 121, the outer diaphragm portion 122, and the at least one supporting portion 123. The outer diaphragm portion 122 is disposed around the inner diaphragm portion 121, the inner diaphragm portion 121 is spaced from the outer membrane portion 122 by the slit, and the supporting portion 123 is connected with the fixing portion 14 to fix the diaphragm 12, so that the diaphragm 12 is in a cantilever state. Therefore, a stress of the diaphragm material is fully released, and smooth movement of the diaphragm is improved.

As shown in FIGS. 1 and 5, the microphone chip 1 further includes a sealing element 15. The sealing element 15 is connected with the back plate 13 and disposed between the back plate 13 and the diaphragm 12. The sealing element 15 is disposed close to an outer periphery of the inner membrane portion 121. The inner membrane portion 121 can be adsorbed on the sealing element 15 in an operating state. The back plate 13 defines at least one air outlet hole 131 and the at least one air outlet hole 131 is used for conducting sound and balancing sound pressure. The at least one air outlet hole 131 is defined in a region of the back plate 13 surrounded by the sealing element 15.

In embodiments, the sealing element 15 has a height. When the microphone is not operated, the diaphragm 12 is separated from the back plate 13 and the sealing element 15. When the microphone is in the operating state, the inner membrane portion 121 is attracted and adsorbed on the sealing element 15 by electrostatic force under bias voltage. The at least one air outlet hole 131 is defined in the region of the back plate 13 surrounded by the sealing element 15, that is, with the sealing element 15 as a boundary line, there is no air outlet hole 131 defined in a region of the back plate 13 between the sealing element 15 and an edge of the back plate 13. When the inner membrane portion 121 is adsorbed on the sealing element 15 in the operating state, the inner membrane portion 121 and the back plate 13 cooperatively define a closed space, to prevent the front cavity 111 and the inner membrane portion 121 from communicatively coupling to the back plate 13. The sealing element 15 is configured to support the inner membrane portion 121 to reach the operating state, thereby reducing the risk of low attenuation of the microphone.

In some embodiments, a number of vent holes (not shown) may also be defined outside the region of the back plate 13 surrounded by the sealing element 15. That is, with the sealing element 15 as the boundary line, at least one vent hole can be defined in the region of the back plate 13 between the sealing element 15 and the edge of the back plate 13. The number of vent holes in this region can be defined according to actual needs, so as to adjust a low attenuation value of the microphone.

Figure 2:
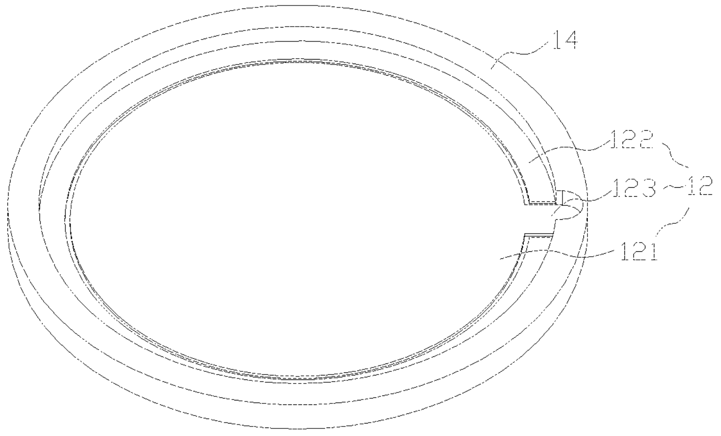
FIG. 2 is a schematic structural view of a diaphragm and a fixing portion in FIG. 1.

As shown in FIG. 2, each supporting portion 123 extends outward from an edge of the inner membrane portion 121 and is connected with the fixing portion 14. The inner membrane portion 121 is fixed through the supporting portion 123, and the inner membrane portion 121 is in a cantilever state, so that the stress of the diaphragm 12 is released and smooth movement of the diaphragm is improved.

In embodiments of the disclosure, there is only one supporting portion 123. That is, the diaphragm 12 can be connected and fixed to the fixing portion 14 by one arm, thereby further ensuring that the stress of the diaphragm 12 is released and improving the smooth movement of the diaphragm. Alternatively, there may be two or three supporting portions 123 or the like according to the actual needs. There is no restriction on the number of the supporting portions 123 on the diaphragm 12.

Figure 3:
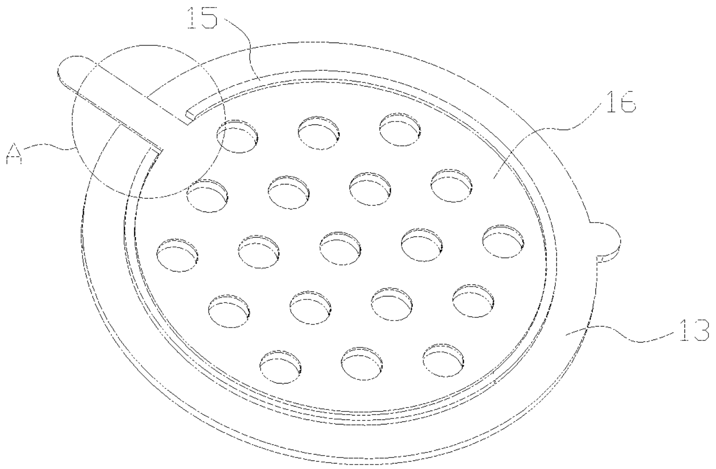
FIG. 3 is a schematic structural view of an electrode sheet and a sealing element in FIG. 1.
Figure 4:
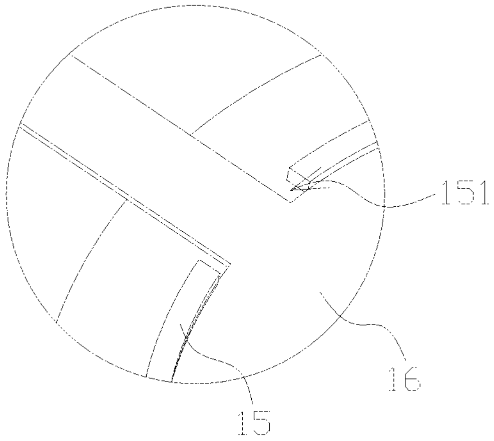
FIG. 4 is an enlarged view of part A of FIG. 3.

Furthermore, as shown in FIGS. 3 and 4, the microphone chip 1 further includes an electrode sheet 16. The electrode sheet 16 is disposed on a side of the back plate 13 adjacent to the diaphragm 12 and disposed inside the sealing element 15. Since the electrode sheet 16 is disposed inside the sealing element 15, the electrode sheet 16 is blocked by the sealing element 15 and cannot be led out. Therefore, in embodiments of the disclosure, at least one notch 151 is defined on the sealing element 15, and the electrode sheet 16 includes an electrode body 161 and at least one lead-out portion 162 connected to the electrode body 161. There may be one or more lead-out portions 162, so that each lead-out portion 162 can extend outward along a corresponding notch 151, and the electrode sheet 16 can be led outward along the notch 151. In embodiments, there is no restriction on the number of the notches 151. The at least one notch 151 is configured as one, two, three, or the like notches 151 according to the requirement of the number of lead-out portions.

As shown in FIG. 4, a height of each notch 151 may be equal to a height of the sealing element 15 in a thickness direction of the microphone chip 1. Alternatively, the height of the notch 151 is less than the height of the sealing element 15 in the thickness direction of the microphone chip 1. That is, the height of the notch 151 is matched with the height of the electrode sheet 16. The notch 151 is defined close to the back plate 13 to avoid a gap between the diaphragm 12 and the sealing element 15 due to the notch 151 defined on the sealing element 15 when the diaphragm 12 is adsorbed on the sealing element 15.

Figure 6:
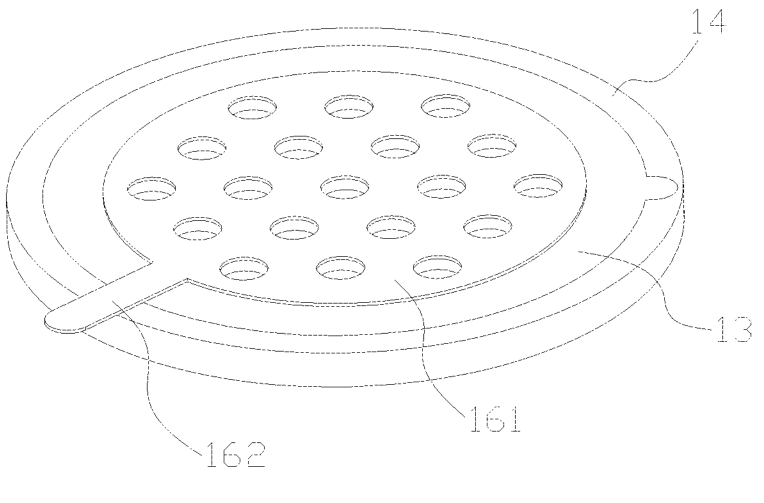
FIG. 6 is a schematic structural view of an electrode sheet and a back plate in FIG. 5.
Figure 7:
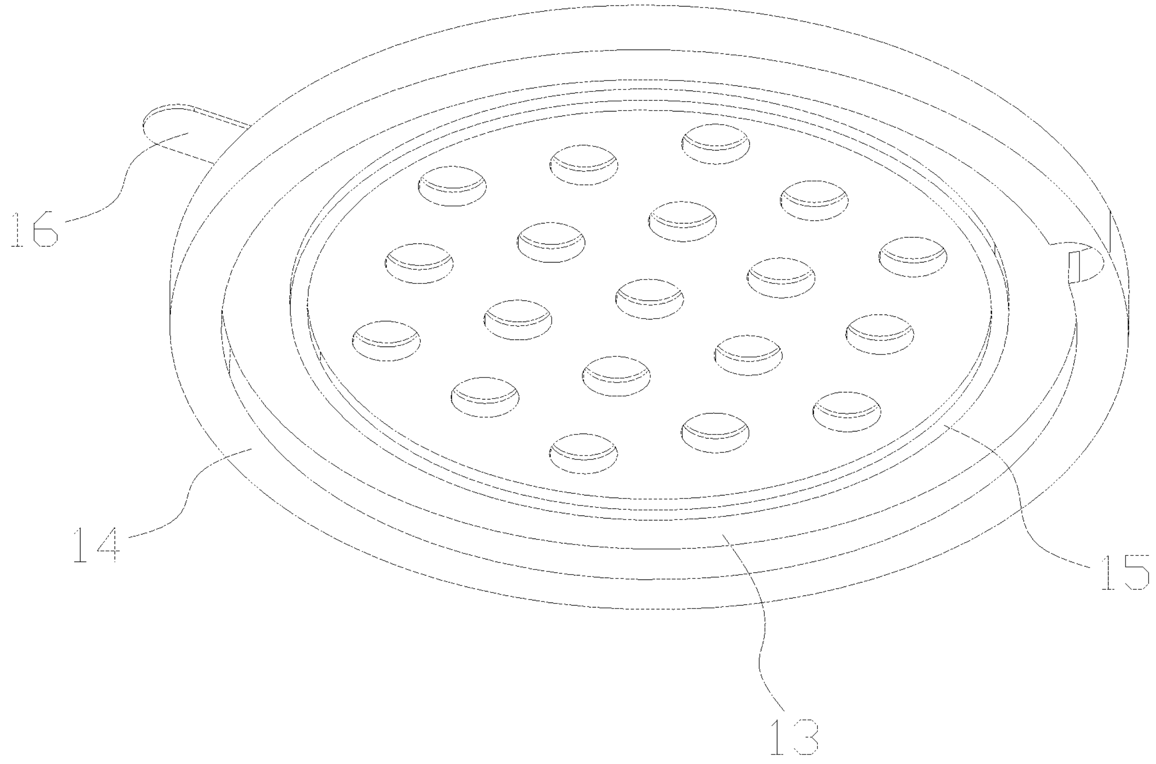
FIG. 7 is a schematic structural view of FIG. 6 from another perspective.

Alternatively, as shown in FIGS. 5 to 7, the electrode sheet 16 is disposed on a side of the back plate 13 away from the diaphragm 12. The electrode sheet 16 includes an electrode body 161 and a lead-out portion 162 connected to the electrode body 161. The lead-out portion 162 extends outward along the electrode body 161 to enable the lead-out of the electrode sheet 16.

The foregoing is merely some embodiments of the disclosure, and it is to be noted that improvements may be made to those of ordinary skill in the art without departing from the technical conception of the disclosure, but these are within the scope of protection of the disclosure.

What is claimed is:

1. A microphone chip, comprising: a substrate having a front cavity; and a capacitive system disposed on the substrate and connected to the substrate, wherein the capacitive system comprises a diaphragm disposed on an upper surface of the substrate and a back plate spaced from the diaphragm, and there is an air spacing defined between the diaphragm and the back plate, wherein the microphone chip further comprises a fixing portion, and the diaphragm and the back plate are respectively connected with the substrate through the fixing portion; the diaphragm comprises an inner membrane portion, an outer membrane portion, and at least one supporting portion, the inner membrane portion is separated from the outer membrane portion by a slit, and the at least one supporting portion is connected with the fixing portion; and the microphone chip further comprises a sealing element, the sealing element is connected with the back plate and disposed between the back plate and the diaphragm, and the sealing element is disposed close to an outer periphery of the inner membrane portion; the microphone chip further comprises an electrode sheet, the electrode sheet comprises an electrode body and at least one lead-out portion; a projection of the electrode body along the vibration direction is located within the sealing element; when the microphone is not operated, the diaphragm is separated from the sealing element; when the microphone is in the operating state, the inner membrane portion id is adsorbed on the sealing element.

2. The microphone chip of claim 1, wherein the back plate defines at least one air outlet hole, and the at least one air outlet hole is defined in a region of the back plate surrounded by the sealing element.

3. The microphone chip of claim 2, wherein the back plate defines at least one vent hole, and the at least one vent hole is defined outside the region of the back plate surrounded by the sealing element.

4. The microphone chip of claim 1, wherein each of the at least one supporting portion extends outward from an edge of the inner membrane portion and is connected to the fixing portion.

5. The microphone chip of claim 4, wherein the at least one supporting portion is configured as one or more supporting portions.

6. The microphone chip of claim 1, wherein the at least one lead-out portion is configured as one or more lead-out portions.

7. The microphone chip of claim 6, wherein the electrode sheet is disposed on a side of the back plate close to the diaphragm, and the electrode body is disposed inside the sealing element; and the sealing element defines at least one notch, and each of the at least one lead-out portion extends outward along a corresponding notch of the at least one notch.

8. The microphone chip of claim 7, wherein a height of each of the at least one notch is equal to a height of the sealing element in a thickness direction of the microphone chip.

9. The microphone chip of claim 7, wherein in a thickness direction of the microphone chip, a height of each of the at least one notch is less than a height of the sealing element, and the at least one notch is defined close to the back plate.

10. The microphone chip of claim 6, wherein the electrode sheet is disposed on a side of the back plate away from the diaphragm; and the at least one lead-out portion extends outward along the electrode body.

11. The microphone chip of claim 1, wherein the at least one supporting portion is configured as a plurality of supporting portions.

* * * * *